United States Patent [19]
Bailey et al.

[11] Patent Number: 5,987,371
[45] Date of Patent: Nov. 16, 1999

[54] APPARATUS AND METHOD FOR DETERMINING THE POSITION OF A POINT ON A WORK IMPLEMENT ATTACHED TO AND MOVABLE RELATIVE TO A MOBILE MACHINE

[75] Inventors: Scott E. Bailey, Washington; Kenneth L. Stratton, Dunlap, both of Ill.

[73] Assignee: Caterpillar Inc., Peoria, Ill.

[21] Appl. No.: 08/759,502

[22] Filed: Dec. 4, 1996

Related U.S. Application Data

[63] Continuation of application No. 08/759,502, Dec. 4, 1996, abandoned.

[51] Int. Cl.$^6$ ................................................ G05B 19/18
[52] U.S. Cl. ........................ 701/50; 701/207; 701/213; 701/214
[58] Field of Search ............................ 701/50, 207, 213, 701/214, 216; 340/988, 990, 991; 37/348; 172/45, 9; 342/357, 358

[56] References Cited

U.S. PATENT DOCUMENTS

| | | | |
|---|---|---|---|
| 4,630,685 | 12/1986 | Huck, Jr. et al. | 172/7 |
| 5,404,661 | 4/1995 | Sahm et al. | 37/348 |
| 5,438,771 | 8/1995 | Sahm et al. | 37/348 |
| 5,483,457 | 1/1996 | Shibata et al. | 364/454 |
| 5,493,494 | 2/1996 | Henderson | 364/424.07 |
| 5,560,431 | 10/1996 | Stratton | 172/2 |
| 5,612,864 | 3/1997 | Henderson | 364/167.01 |
| 5,646,844 | 7/1997 | Gudat et al. | 364/449.2 |
| 5,684,476 | 11/1997 | Anderson | 340/988 |
| 5,694,317 | 12/1997 | Nakagami et al. | 364/424.07 |
| 5,699,247 | 12/1997 | Moriya et al. | 364/424.07 |

*Primary Examiner*—William A. Cuchlinski, Jr.
*Assistant Examiner*—Arthur D. Donnelly
*Attorney, Agent, or Firm*—James R. Yee; Steve D. Lundquist

[57] ABSTRACT

An apparatus and method determines the position of a point on a work implement attached to and movable relative to a mobile machine. The apparatus includes a site coordinate system position sensor mounted on the mobile machine, a ground speed sensor mounted on the mobile machine, an implement position sensor mounted on the mobile machine and coupled to the work implement, and a pitch sensor mounted on the machine. A controller is adapted to receive a reference point position signal from the site coordinate system position sensor, the reference point position signal being indicative of a position of a reference point on the mobile machine in a site coordinate system, to receive an implement position signal from the implement position sensor, a ground speed signal from the ground speed sensor and a pitch signal from the pitch sensor, and to determine the position of the point on the work implement in site coordinates compensating for the pitch of the machine and the translational movement of the machine as a function of the reference point position signal, the implement position signal, the ground speed signal, and the pitch signal.

4 Claims, 9 Drawing Sheets

Fig_5_
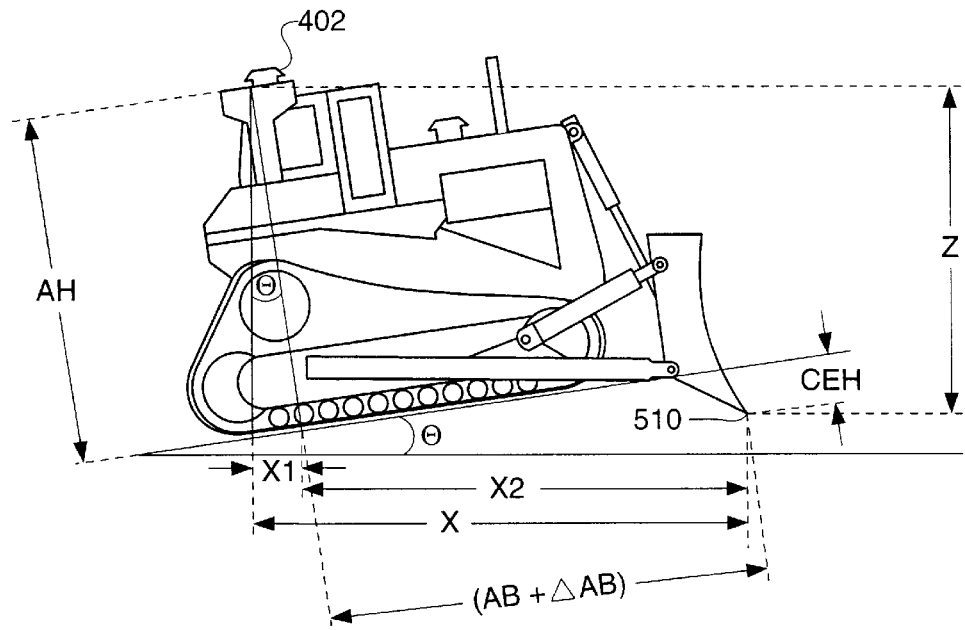
Fig_6_
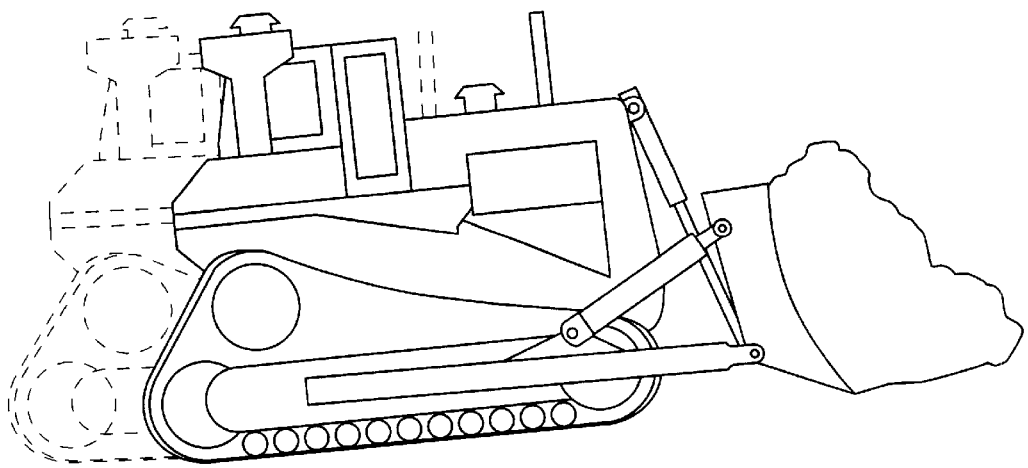

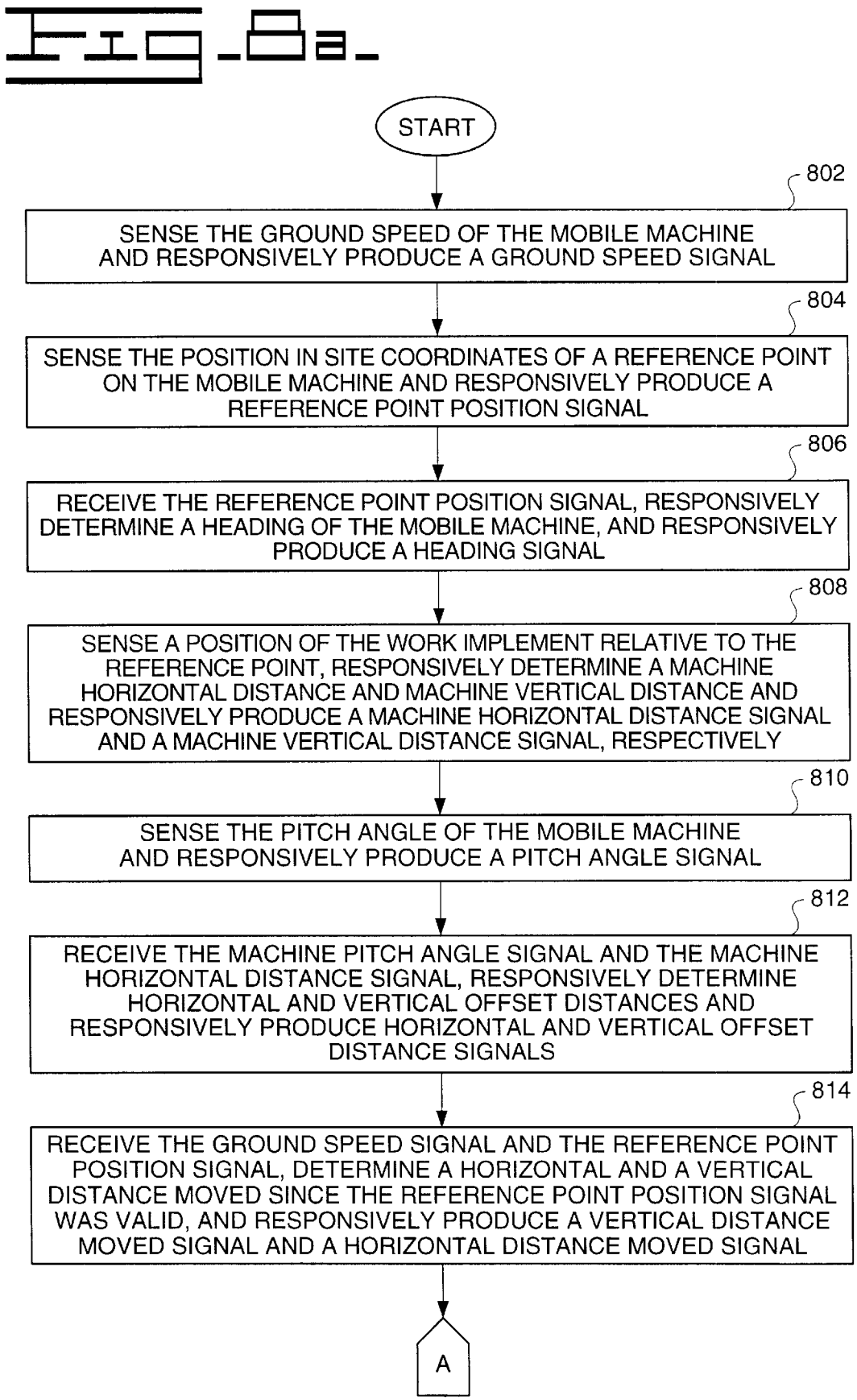

816 — RECEIVE THE HORIZONTAL DISTANCE MOVED SIGNAL AND THE HEADING SIGNAL, RESPONSIVELY DETERMINE A DISTANCE MOVED IN THE FIRST DIRECTION AND A DISTANCE MOVED IN THE SECOND DIRECTION, AND PRODUCE FIRST DIRECTION DISTANCE MOVED AND SECOND DIRECTION DISTANCE MOVED SIGNALS

818 — RECEIVE THE VERTICAL DISTANCE MOVED AND THE FIRST AND SECOND DIRECTION DISTANCE MOVED SIGNALS, RESPONSIVELY DETERMINE A CURRENT POSITION OF THE REFERENCE POINT IN SITE COORDINATES, AND PRODUCE A CURRENT REFERENCE POINT POSITION SIGNAL

820 — RECEIVE THE HORIZONTAL AND VERTICAL OFFSETS DISTANCE SIGNALS AND THE HEADING SIGNAL, RESPONSIVELY DETERMINE A DISTANCE BETWEEN THE REFERENCE POINT AND THE POINT ON THE WORK IMPLEMENT IN THE FIRST DIRECTION, A DISTANCE BETWEEN THE REFERENCE POINT AND THE POINT ON THE WORK IMPLEMENT IN THE SECOND DIRECTION, AND A DISTANCE BETWEEN THE REFERENCE POINT AND THE POINT ON THE WORK IMPLEMENT IN THE THIRD DIRECTION, AND RESPONSIVELY PRODUCE FIRST, SECOND, AND THIRD POSITION DIFFERENCE SIGNALS, RESPECTIVELY

822 — RECEIVE THE CURRENT REFERENCE POINT POSITION SIGNAL AND THE FIRST, SECOND, AND THIRD POSITION DIFFERENCE SIGNALS AND RESPONSIVELY DETERMINE THE POSITION OF A POINT ON THE WORK IMPLEMENT IN SITE COORDINATES

END

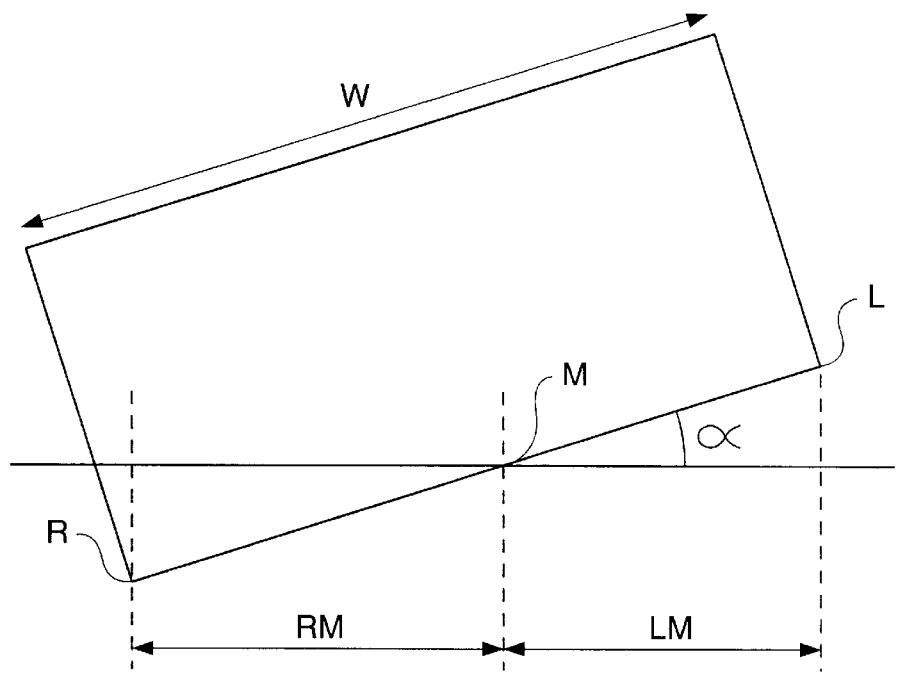
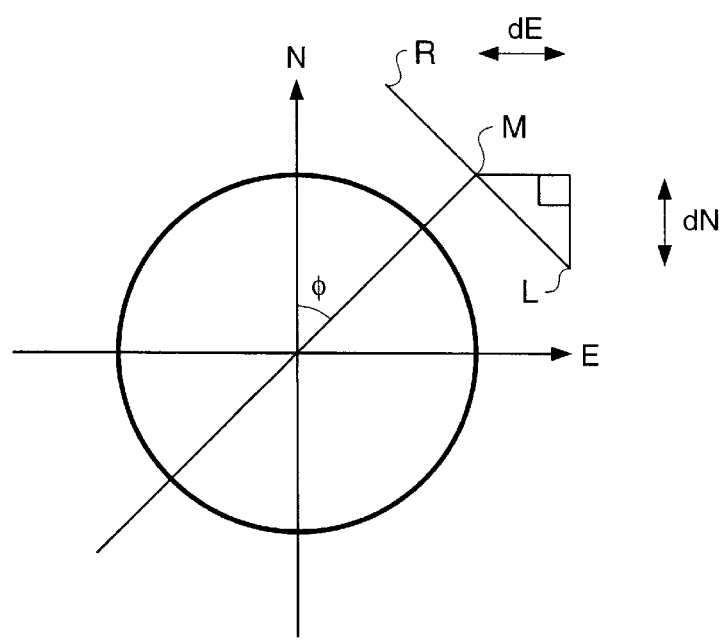

5,987,371

APPARATUS AND METHOD FOR DETERMINING THE POSITION OF A POINT ON A WORK IMPLEMENT ATTACHED TO AND MOVABLE RELATIVE TO A MOBILE MACHINE

This is a file wrapper continuation of application Ser. No. 08/759,502, filed Dec. 4, 1996, now abandoned.

TECHNICAL FIELD

This invention relates generally to mobile earthmoving machine, and more particularly, to an apparatus and method for determining the position of a point on a work implement attached to and movable relative to a mobile earthmoving machine.

BACKGROUND

Computer-based aids for earthmoving machines are becoming more common. For example, systems are being developed which utilize the Global Positioning System (GPS) satellites for determining the position of the machine and even the position of an earthmoving tool.

Other systems compile a data base of this position information. The database is continuously updated as the earthmoving machine modifies the site. One such system is disclosed in U.S. Pat. No. 5,493,494, issued to Henderson. The system disclosed by Henderson displays the vehicle on a video screen to aid the operator in operation of the machine. The database may include information related to the site, such as the position of points or sections of the work site in a site coordinate system.

As the earthmoving machine modifies the site, the site surface changes and the database must be updated. Positioning systems, such as GPS, may be used to determine the position of points located on the new or modified site surface.

Problems are encountered in such systems when attempting to determine the position in site coordinates of points on the site surface to an acceptable accuracy. For example, a GPS receiver determines the position of the GPS antenna, not the site surface. The accuracy of any position estimate for the site surface based solely on GPS will be inaccurate because the machine is moving, the machine is pitched and rolled with respect to the site surface, and there is a time lag between the time when a position estimate is accurate and the time the estimate is received.

The present invention is aimed at solving one or more of the problems as set forth above.

SUMMARY OF THE INVENTION

In one aspect of the present invention, an apparatus for determining the position of a point on a work implement attached to and movable relative to a mobile machine is provided. The apparatus includes a site coordinate system position sensor mounted on the mobile machine, a ground speed sensor mounted on the mobile machine, an implement position sensor mounted on the mobile machine and coupled to the work implement, and a pitch sensor mounted on the machine. A controller is adapted to receive a reference point position signal from the site coordinate system position sensor, the reference point position signal being indicative of a position of a reference point on the mobile machine in a site coordinate system, to receive an implement position signal from the implement position sensor, a ground speed signal from the ground speed sensor and a pitch signal from the pitch sensor, and to determine the position of the point on the work implement in site coordinates compensating for the pitch of the machine and the translational movement of the machine as a function of the reference point position signal, the implement position signal, the ground speed signal, and the pitch signal.

In another aspect of the present invention, a method for determining the position of a point on a work implement attached to and movable relative to a mobile machine is provided. The method includes the steps of sensing the position of a predetermined reference point on the mobile machine in a site coordinate system and responsively producing a reference point position signal, sensing the ground speed of the mobile machine and responsively producing a ground speed signal, sensing the position of the point on the work implement with respect to the mobile machine and responsively producing an implement position signal, and sensing the pitch angle of the mobile machine and responsively producing a pitch signal. The method further includes the steps of determining the position of the point on the work implement in site coordinates as a function of the implement position, the reference point position signal, the ground speed signal, and the pitch signal while compensating for the pitch and the translational movement of the machine.

BRIEF DESCRIPTIONS OF THE DRAWINGS

FIG. 5 is a diagrammatic illustration of the mobile machine of FIG. 1, illustrating the geometry of the machine;

FIG. 6 is a diagrammatic illustration of the mobile machine of FIG. 1, illustrating translational movement;

FIG. 8A is a first portion of a flow diagram illustrating operation of the present invention, according to a second embodiment;

FIG. 8B is a second portion of the flow diagram of FIG. 8A;

FIG. 9 is a diagrammatic front view of a work implement; and

FIG. 10 is a diagrammatic view of a work site showing a work implement in a site coordinate system.

BEST MODE FOR CARRYING OUT THE INVENTION

Figure 1:
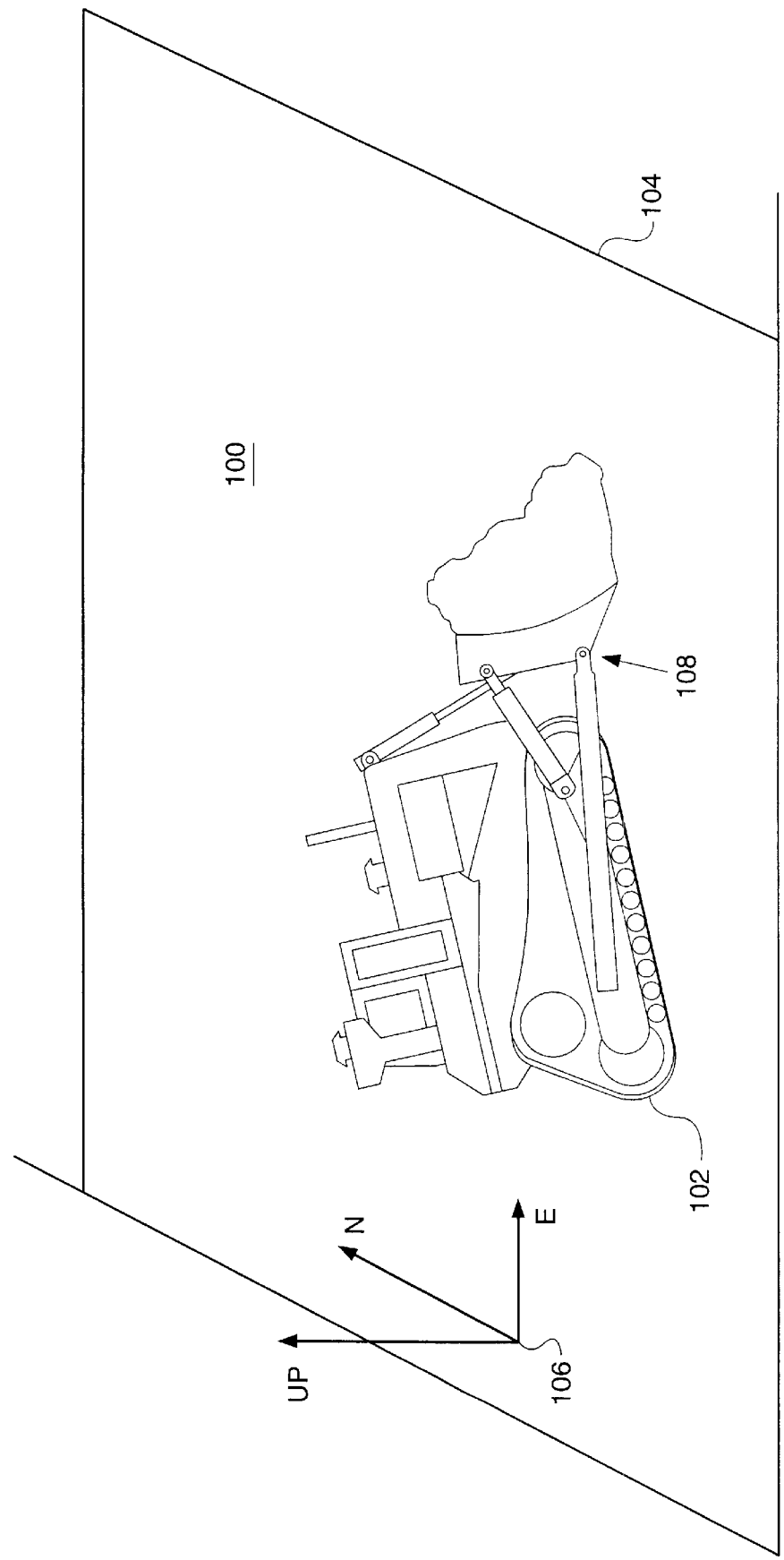
FIG. 1 is a diagrammatic illustration of a mobile earthmoving machine operating at a work site having a site coordinate system.

With reference to FIG. 1, the present invention provides an apparatus 100 and method for determining the position of a point on a work implement 108 attached to and movable relative to a mobile machine 102. The point may be any point on the work implement 108, such as the midpoint or any two or more points, such as the left and right endpoints.

The mobile machine 102 operates in a work site, diagrammatically illustrated by plane 104. Locations within the work site 104 are represented in a work site coordinate system 106 defined by vectors in the North ($\overline{N}$), East ($\overline{E}$), and Up ($\overline{UP}$) directions.

Figure 2:
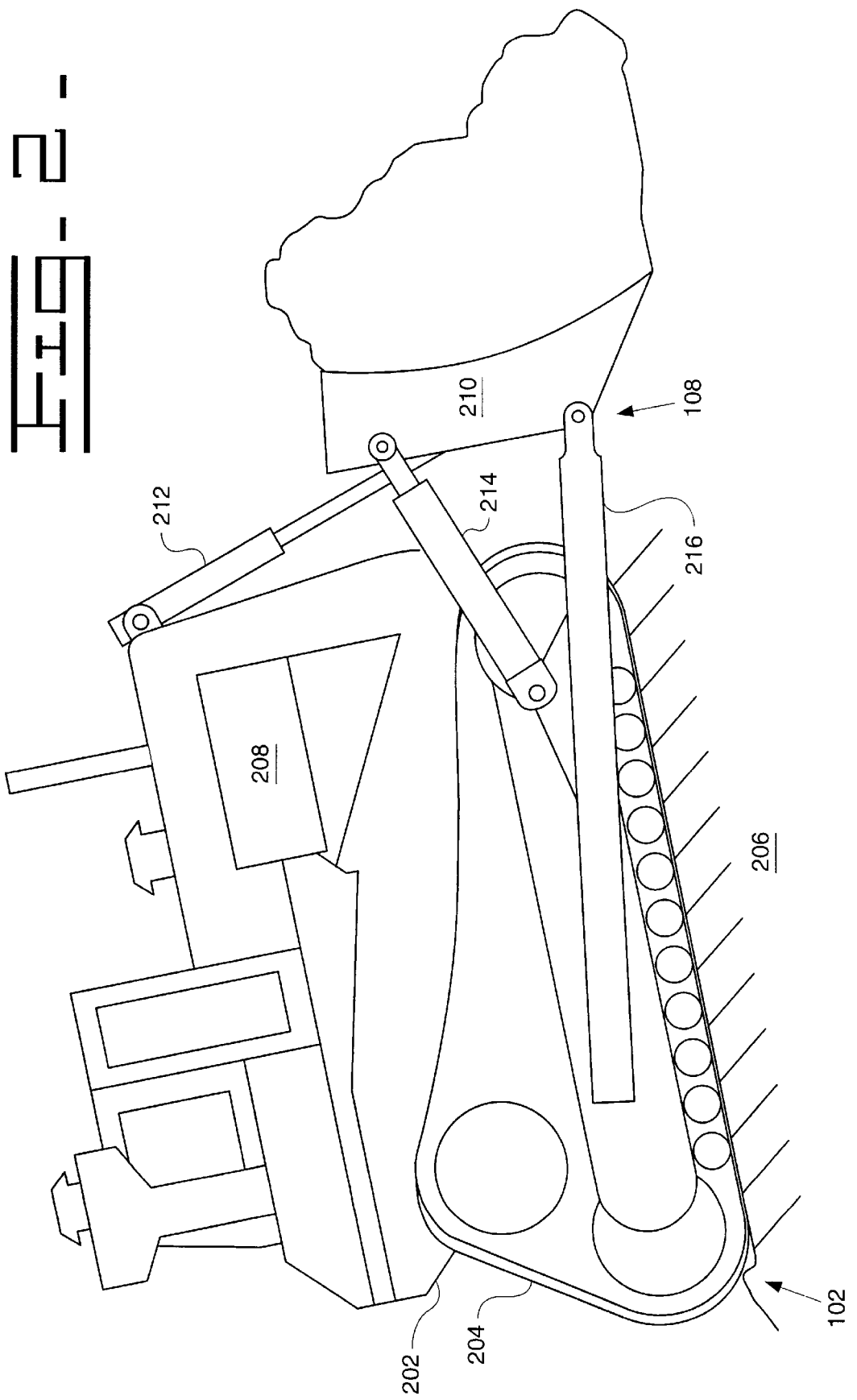
FIG. 2 is a diagrammatic illustration of the mobile earthmoving machine shown as a track-type tractor.

With reference to FIG. 2, the work implement 108 is elevationally movably connected to the mobile machine 102. The particular mobile machine 102 shown is a track-type tractor or dozer. However, it is to be noted that other work machines, for example, a profiler, a motorgrader, a scraper, a road reclaimer, a wheel loader and the like are equivalents and within the scope of this invention.

The work machine 102 has a frame 202 and a plurality of rotatable members 204 connected to the frame 202 at opposite end portions of the frame 202. The rotatable members 204 are shown as crawler track, however, wheels and other suitable rotatable ground engaging members are considered equivalents and within the spirit of the invention. The rotatable members 204 support the frame 202 on a geographic surface 206. A prime mover 208, such as an internal combustion engine, is mounted on the frame 202 and drivingly connected to the plurality of rotatable members 204 in any suitable and conventional manner, such as by a mechanical, fluid, or hydrostatic transmission (not shown). The prime mover 208 rotates the rotatable members 204 and propels the work machine 102 over the underlying geographic surface 206.

The work implement 108 104 has a cutting portion 210 and is elevationally movably connected to the frame 202. A pair of spaced apart lift jacks colanders 212 (only one of which is shown) connected to the work implement 108 elevationally moves the work implement 108 relative to the frame 202. In the embodiment shown, the work implement 108 is a bulldozer blade substantially transversely oriented relative to the longitudinal axis of the frame 202. It is to be noted that any similar geographic surface altering work implement 108, for example, motor grader blades, scraper bowls, and the like, is a suitable equivalent and within the scope of the invention.

The lift cylinders 212 are connected to and between the frame 202 and the work implement 108 at transversely spaced apart locations on the frame 202. The lift cylinders 212 are fluid operated, telescopic, and actuatable to elevationally move the work implement 108 relative to the frame 202. The lift cylinders 212 are movable between a first position at which the rods of the lift cylinders 212 are retracted and the work implement 108 is elevationally raised toward the frame 202 and a second position at which the rods are extended and the work implement 108 is elevationally lowered away from the frame 202. In one embodiment, the work implement 108 cannot be tilted relative to the frame 202. In another embodiment, the lift cylinders 212 may be used to tilt the work implement 108 relative to the frame 202.

The cutting portion 210 is pivotally connected to a support bar 216 on each side of the movable machine 102. The cutting portion 210 is pivoted about a point on the support bar 216 by a pair of tip cylinders 214 (only one of which is shown).

Figure 3:
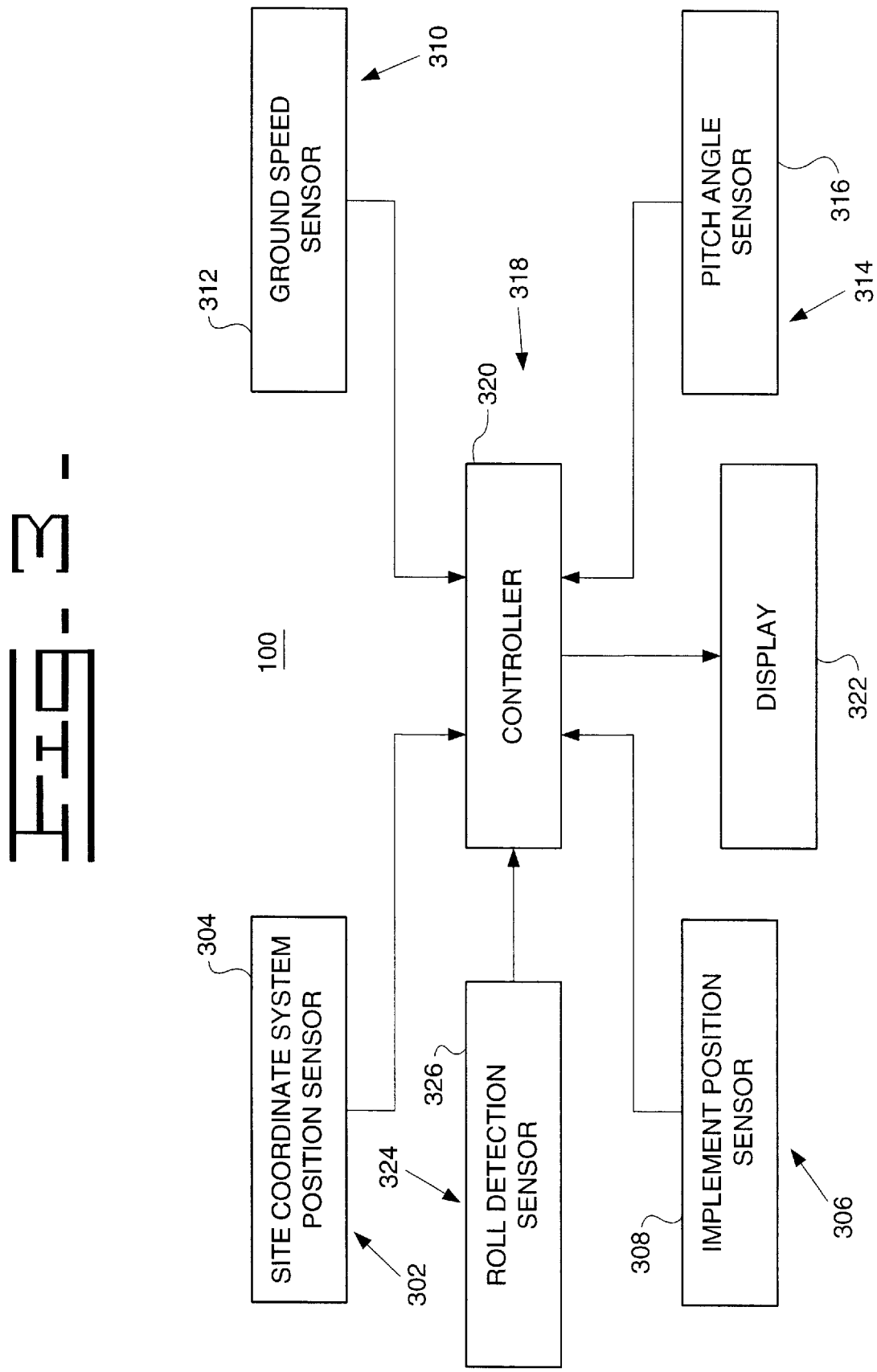
FIG. 3 is a block diagram of an apparatus for determining the three dimensional position in site coordinates of a point on a work implement of the mobile machine of FIG. 1, according to an embodiment of the present invention.

With reference to FIG. 3, the apparatus 100 includes site coordinate system position sensing means 302, implement position sensing means 306, ground speed sensing means 310, a pitch sensing means 314 and roll angle sensing means 324.

The site coordinate system position sensing means 302 senses the position of a predetermined reference point on the mobile machine 102 in the site coordinate system 106 and responsively produces a reference point position signal. The site coordinate system position sensing means 302 includes a site coordinate system position sensing means 302.

Figure 4:
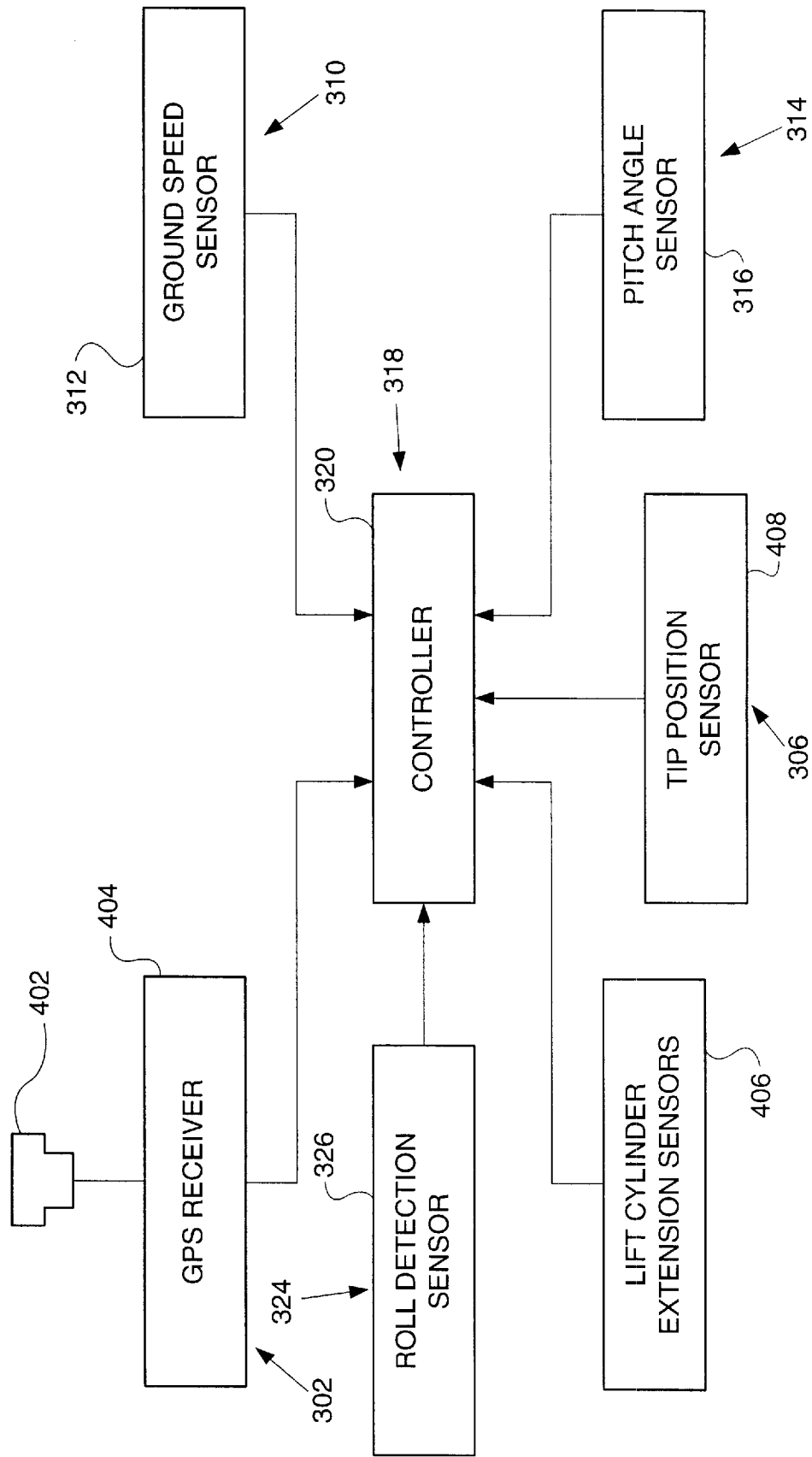
FIG. 4 is a block diagram of an apparatus for determining the three dimensional position in site coordinates of a point on a work implement of the mobile machine of FIG. 1, according to another embodiment of the present invention.

With reference to FIG. 4, in the preferred embodiment the site coordinate system position sensor 307 includes a GPS antenna 402 mounted on the mobile machine 102. The GPS antenna 402 receives signals from a plurality of GPS satellites. A GPS receiver 404 receives the signals from the GPS antenna 402 and responsively determines the position of the GPS reference antenna 402. Preferably, the GPS antenna 402 and GPS receiver 404 are part of a differential GPS system which utilizes a differential GPS receiver (not shown) at a known location to increase the accuracy of position estimates. The position determined by the GPS receiver 404 is defined in terms of the site coordinate system 106. Differential GPS systems are well known in the art and are therefore not further discussed.

Alternatively, the site coordinate system position sensing means 302 may include any suitable system for determining the position of a reference point on the machine 102 in site coordinates. For example, laser plane transmitters and receivers or combination of laser plane and GPS may also be used to determine the position of the reference point.

The ground speed sensing means 310 senses the ground speed of the mobile machine 102 and responsively produces a ground speed signal.

The implement position sensing means 306 senses the position of the point on the work implement 108 with respect to the mobile machine 102 and responsively produces an implement position signal.

The roll angle sensing means 324 includes a roll detection sensor 326 for sensing a roll angle, $\alpha$.

Referring again to FIG. 4, in the preferred embodiment the implement position sensing means 306 includes a pair of lift cylinder extension sensors 406 for determining the extension of the respective left cylinder 212.

The implement position sensing means 306 also includes a tip position sensor 408 for determining the tip (forward and back) of the work implement 108 relative to the frame 202. Preferably, the tip of the work implement 108 is determined based on the extension of the tip cylinders 214. In the preferred embodiment, the tip position sensor 408 includes a sensor for sensing engine speed. An estimate of flow of hydraulic fluid to the tip cylinders 214 is determined as a function of engine speed. By integrating the flow, relative position may be determined. Alternatively, linear extension, magneto strictive, radio frequency sensor or the like may also be used.

The pitch sensing means 314 senses the pitch angle ($\theta$) of the mobile machine 102 and responsively produces a pitch angle signal. In the preferred embodiment, the pitch sensing means 314 include a pitch angle sensor 316. A pitch rate sensor (not shown) may be used to improve accuracy. The pitch rate may be integrated to determine pitch.

It should be noted that the roll and pitch sensing means 324, 314 may include other apparatus for sensing the roll and pitch. For example, roll and pitch may be determined by using position estimates from two GPS antennas placed at different locations on the machine 102.

A controlling means 318 receives the implement position signal and responsively determines a position of the work implement 108 relative to the reference point, receives the reference point position signal, the ground speed signal, and the pitch signal and determines the position of the point on the work implement in site coordinates while compensating for the pitch and translational movement of the machine 102.

In the preferred embodiment, the controlling means 318 includes a microprocessor based controller 320. The controller 320 receives signals from the sensors and is programmed to determine the position in site coordinates of at least one point on the work implement 108.

Figure 7:
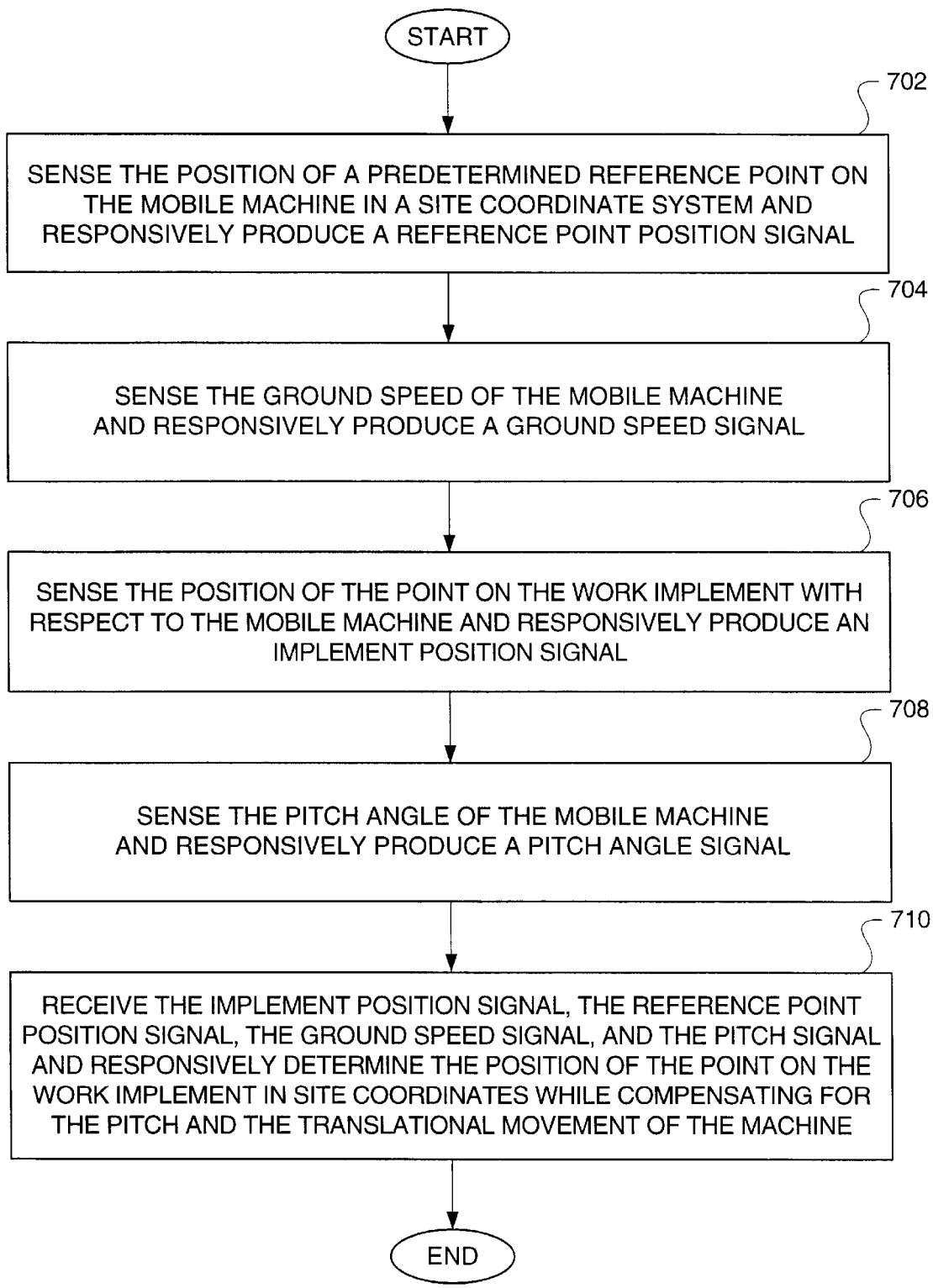
FIG. 7 is a flow diagram illustrating operation of the present invention, according to a first embodiment.

Advantageously, the controller 320 is programmed to receive signals from the sensing means and to determine the position of at least one point on the work implement in site coordinates. With reference to FIG. 7, operation of the controller 320 according to one embodiment of the present invention is shown.

In a first control block 702, the position of the predetermined reference point on the mobile machine 102 in site coordinates is sensed and a reference point position signal is responsively produced.

In a second control block 704, the ground speed of the mobile machine 102 is sensed and a ground speed signal is produced.

In a third control block 706, the position of the point on the work implement 108 with respect to the mobile machine 102 is sensed and an implement position signal is produced.

In a fourth control block 708, the pitch angle of the mobile machine 102 is sensed and a pitch angle signal is produced.

In a fifth control block 710, the position of the point on the work implement 108 is determined as a function of the implement position signal, the reference point position signal, the ground speed signal, and the pitch signal. This step compensates for the pitch of the machine 102 and the translational movement of the machine 102.

Referring to FIGS. 8A and 8B, a second embodiment of the present invention will now be discussed.

In a first control block 802, the ground speed of the mobile machine 102 is sensed and a ground speed signal is produced.

In a second control block 804, the position in site coordinates of the reference point on the mobile machine 102 is sensed and a reference point position signal is produced. Preferably, the reference point is at the GPS antenna 402 and the reference point position is expressed as (N, E, UP).

In a third control block 806, the heading of the mobile machine 102 is determined. In the preferred embodiment, the heading of the mobile machine 102 is determined by combining successive reference point positions and the pitch and roll angles at each point. Preferably, the heading is expressed as an angle (101) from $\overline{N}$ (Northing) measured positive in a clockwise direction.

In a fourth control block 808, the position of the point on the work implement 108 relative to the reference point is determined. With reference to FIG. 5, the position of a blade point 510 on the work implement 108 is preferably determined as a machine vertical distance and a machine horizontal distance between the reference point and the blade point 510. The machine horizontal distance (AB+ΔAB) is the distance along the transverse axis of the mobile machine 102 from the reference point to the blade point 510.

The GPS antenna 402 is preferably located at the reference point. With the bottom edge of the work implement 108 in the same plane (machine plane) as the bottom of the mobile machine 102 and the tip cylinders 214 fully retracted, the machine horizontal distance is a constant (AB). Changes in the machine horizontal distance are called ΔAB. A machine vertical distance (CEH) is the distance between the machine plane and the blade point 510. Movement of the work implement 108 from this position changes the machine horizontal and vertical distances.

In the preferred embodiment, the position of the blade point 510 relative to the reference point is a function of the extension of the lift cylinders 212 and tip cylinders 214. Advantageously, the lift and tip extensions are sensed and scaled to determine the machine vertical distance (CEH) and machine horizontal distance(AB+ΔAB). Preferably, the machine horizontal distance is determined as a change on the horizontal distance (ΔAB). Thus, the total horizontal distance is AB+ΔAB.

Returning to FIG. 8A, in a fifth control block 810 the pitch angle (θ) of the mobile machine 102 is sensed and a machine pitch angle signal is produced. Additionally, pitch rate may also be sensed and integrated to improve the accuracy of the machine pitch estimate.

In a sixth control block 812, the machine pitch angle signal and the machine horizontal distance signal are received and a horizontal distance offset (X) and a vertical distance offset (Z) are determined. X and Z represent the distances between the position of the reference point and the blade point 510.

As shown in FIG. 5, the horizontal distance offset (X) is in the horizontal plane defined by the $\overline{N}$ and $\overline{E}$.

The calculations for X are shown below:

$$X = X_1 + X_2$$
$$X_1 = Y \cdot \sin \Theta$$
$$X_2 = (AB + \Delta AB) \cdot \cos \Theta$$
$$X = X_1 + X_2$$
$$= Y \cdot \sin \Theta + (AB + \Delta AB) \cdot \cos \Theta,$$

where Y is the fixed vertical distance between the reference point and the plane formed by the tracks of the mobile machine 102.

The vertical distance offset Z is perpendicular to the horizontal plane formed by the N and E axes. In the preferred embodiment, Z is determined by the equation:

$$Z = (AB + \Delta AB) \cdot \sin \theta + (CEH - Y) \cdot \cos \theta.$$

In a seventh control block 814, the ground speed signal and the reference point position signal are received, and a machine horizontal distance moved (horizontal_distance_tm) and a machine vertical distance moved(vertical_distance_tm) are determined as a function thereof, and machine horizontal and vertical distances moved signals are produced.

With reference to FIG. 6, the machine horizontal and vertical distances moved are defined as the distances moved from the time the reference position was valid to the current time. In other words there is a time lag from the determination of the position of the reference point to the calculation of the position of the blade point 510. Motion during the time lag is known as translational movement.

For example, for the GPS receiver used, the time lag is typically between 80–150 milliseconds. Additionally, microcontroller loop time of 50 milliseconds are typical. However, other systems may have a time lag of 2 seconds or more.

The machine horizontal distance moved is the distance moved in the North-East plane in the direction indicated by heading. The machine vertical distance moved is measured along an axis perpendicular to the North-East plane.

In the preferred embodiment, the machine vertical and horizontal distances moved are determined by:

vertical_distance_tm=ground_speed·latency·sin θ, horizontal_distance_tm=ground_speed·latency·cos θ.

where ground_speed is sensed, θ is the machine pitch angle, and latency is the time lag. Preferably, the time lag is estimated as a constant.

With reference to FIG. 8B, in an eighth control block 816, the machine horizontal distance moved signal and the heading signal (Φ) are received, the distances moved due to translational motion in first and second directions are determined, and a distance moved in a first direction signal and a distance moved in a second direction signal are produced.

In the preferred embodiment, the first and second directions are North and East. The distance moved in the first and second directions (ΔN, ΔE) are determined by:

ΔN=horizontal_distance_tm·cos (Φ);

ΔE=horizontal_distance_tm·sin (Φ).

In a ninth control block 818, the distance moved in the first and second direction signals and the vertical distance moved signal are received, a current position of the reference point in site coordinates is determined and a current reference point position signal is produced. The current position of the reference point in site coordinates (N', E', UP') is determined by:

$N'=N+\Delta N;$ $E'=E+\Delta E;$ and $UP'=UP+\Delta UP,$ where ΔUP is equal to vertical_distance_tm and N, E, and UP are the position of the reference point (from the GPS receiver) in site coordinates.

In a tenth control block 820 the horizontal distance offset signal (X), the vertical distance offset signal (Z), and the heading signal are received and a distance between the reference point and the point on the work implement in the first direction, a distance between the reference point and the point on the work implement in the second direction, a distance between the reference point and the point on the work implement in the third direction are determined and first, second, and third position difference signals are responsively produced. In the preferred embodiment, the first, second, and third directions correspond to $\overline{N}$, $\overline{E}$, and $\overline{UP}$, respectively.

The first, second, and third position differences represent the distances between the GPS antenna 402 and a blade point on the cutting edge 210 in the site coordinate system. The position differences due to pitch and cylinder extensions are determined by:

Δcutting_edge_N=X·sin (Φ);

Δcutting_edge_E=X·cos (Φ); and

Δcutting_edge_up=Y·cos (θ)+Z.

In an eleventh control block 822, the three-dimensional position of the blade point in site coordinates is determined as a function of the current reference point position signal and the first, second, and third position difference signals. The position of a blade point in site coordinates is represented as (cutting_edge_N, cutting_edge_E, cutting_edge_UP) and are determined by:

cutting_edge_N=N'+Δcutting_edge_N;

cutting_edge_E=E'+Δcutting_edge_E; and, cutting_edge_UP=UP'+cutting_edge_UP.

In one embodiment, the blade point is the midpoint of the cutting edge of the work implement 108. In this embodiment, the position of the midpoint in site coordinates is represented by cutting_edge_N, cutting_edge_E, and cutting_edge_UP.

In another embodiment, the positions of two blade points are determined. For example, in the preferred embodiment the positions of left and right blade endpoints are determined in site coordinates. For each point, the position as determined above must be adjusted to account for machine roll and blade tilt.

With reference to FIG. 9, blade roll, α is a function of machine roll and blade tilt. A positive value of α indicates counter-clockwise blade roll. Width of the blade is represented as W.

With reference to FIG. 10, for each point, the North, East, and UP (cutting_edge_N, cutting_edge_E, cutting_edge_UP) coordinates must be adjusted for blade roll.

In the preferred embodiment, the left and right blade endpoints (L,R) are determined as offsets from the blade midpoint (M). The determination of the position of the right blade endpoint will now be discussed.

The change in the UP coordinate (dUP) for the right blade endpoint (R) due to blade roll (α) is determined by:

$dUP=W/2 \sin \alpha.$

To determine the change in the North and East coordinates for the right blade endpoint (R), the distance (RM) from the midpoint to the right blade endpoint in the machine plane in a direction perpendicular to the heading (φ) is determined by:

$RM=W/2 \cos \alpha.$

The changes in the North and East coordinates are determined by:

$dN=-RM \sin \phi$ and $dE=RM \cos \phi.$

The position of the right blade endpoint in site coordinates is determined by adding the change in the coordinates (dUP, dN, and dE) to the position of the blade midpoint in site coordinates (cutting_edge_N, cutting_edge_E, cutting_edge_UP).

The position of the left blade endpoint in site coordinates are determined by subtracting the change in the coordinates (dUP, dN, and dE) to the position of the blade midpoint in site coordinates (cutting_edge_N, cutting_edge_E, cutting_edge_UP).

Alternatively, site information may be stored in a site database. The site is represented by a series of geometric shapes, e.g., squares. The position of a blade point may be determined as being in a specific square.

The blade point position in site coordinates may be displayed to an operator via a display 322. Alternatively, the site database may include a site boundary associated with each square. The controller 320 may be adapted to limit or control the position of the work implement 108 with respect to the boundary.

Industrial Applicability

With reference to the drawings and in operation the present invention provides an apparatus and method for determining the position of a point (blade point) on a work implement 108 of a mobile machine 102 in a site coordinate system.

As discussed above, a GPS receiver 404 is used to determine the position of a reference point on the machine 102 in site coordinates. Sensors are used to determine the position of the blade point relative to the machine 102, the speed of the machine 102, and the pitch of the machine 102. The sensor information is used to calculate the position of the blade point in site coordinates, compensating for the pitch of the machine 102 and the translational movement of the machine 102.

The blade point position in site coordinates may be displayed to an operator via a display 322. Alternatively, the site database may include a site boundary associated with each square. The controller 320 may be adapted to limit or control the position of the work implement 108 with respect to the boundary.

Other aspects, objects, advantages and uses of the present invention can be obtained from a study of the drawings, disclosure and appended claims.

We claim:

1. An apparatus for determining the position of a point on a work implement attached to and movable relative to a mobile machine, comprising:

a site coordinate system position sensor mounted on the mobile machine;

a ground speed sensor mounted on the mobile machine;

an implement position sensor mounted on the mobile machine and coupled to the work implement;

a pitch sensor mounted on the machine;

a controller adapted to receive a reference point position signal from the site coordinate system position sensor, the reference point position signal being indicative of a position of a reference point on the mobile machine in a site coordinate system, to receive an implement position signal from the implement position sensor, a ground speed signal from the ground speed sensor, and a pitch angle signal from the pitch sensor, and to determine the position of the point on the work implement in site coordinates compensating for the pitch of the machine and the translational movement of the machine as a function of the reference point position signal, the implement position signal, the ground speed signal, and the pitch angle signal.

2. An apparatus for determining the position of a point on a work implement attached to and movable relative to a mobile machine, comprising:

site coordinate system position sensing means for sensing the position of a predetermined reference point on the mobile machine in a site coordinate system and responsively producing a reference point position signal;

ground speed sensing means for sensing the ground speed of the mobile machine and responsively producing a ground speed signal;

implement position sensing means for sensing the position of the point on the work implement with respect to the mobile machine and responsively producing an implement position signal;

pitch sensing means for sensing the pitch angle of the mobile machine and responsively producing a pitch angle sensor;

controlling means for receiving the implement position signal, the reference point position signal, the ground speed signal, and the pitch signal and responsively determining the position of the point on the work implement in site coordinates, compensating for the pitch and the translational movement of the machine.

3. A method for determining the position of a point on a work implement attached to and movable relative to a mobile machine, including the steps of:

sensing the position of a predetermined reference point on the mobile machine in a site coordinate system and responsively producing a reference point position signal;

sensing the ground speed of the mobile machine and responsively producing a ground speed signal;

sensing the position of the point on the work implement with respect to the mobile machine and responsively producing an implement position signal;

sensing the pitch angle of the mobile machine and responsively producing a pitch angle signal;

receiving the implement position, the reference point position signal, the ground speed signal, and the pitch signal and responsively determining the position of the point on the work implement in site coordinates while compensating for the pitch and the translational movement of the machine.

4. A method for determining the position of a point on a work implement attached to and movable relative to a mobile machine, the mobile machine operating in a work site having a site coordinate system, the site coordinate system defined by vectors in first and second directions in a horizontal plane and a third direction, the first and second directions being perpendicular and the third direction being perpendicular to the horizontal plane, including the steps of:

sensing a ground speed of the mobile machine and responsively producing a ground speed signal;

sensing a position in site coordinates of a reference point on the mobile machine and responsively producing a reference point position signal;

receiving the reference point position signal, responsively determining a heading of the mobile machine, and responsively producing a heading signal;

sensing a position of the work implement relative to the reference point, responsively determining a machine horizontal distance and machine vertical distance and responsively producing a machine horizontal and vertical distance signals, respectively;

sensing a pitch angle of the mobile machine and responsively producing a machine pitch angle signal;

receiving the machine pitch angle signal and the machine horizontal and vertical distance signals, responsively determining horizontal offset and vertical offset distances in the horizontal plane and in the third direction, respectively, between the reference point and the point on the work implement and responsively producing horizontal and vertical offset distance signals;

receiving the ground speed signal, machine pitch angle signal and the reference point position signal, determining a horizontal and a vertical distance moved since the reference point position signal was valid; and responsively producing a vertical distance moved signal and a horizontal distance moved signal;

receiving the vertical distance moved and horizontal distance moved signals and the heading signal and the corrected reference point signal, responsively determining a distance moved in the first direction and a distance moved in the second direction, and producing first direction distance moved and second direction distance moved signals;

receiving the vertical distance moved signal and the first and second direction distance moved signals, responsively determining a current position of the reference point in site coordinates and producing a current reference point position signal;

receiving the horizontal distance signal, the vertical distance signal, and the heading signal, responsively determining a distance between the reference point and the point on the work implement in the first direction, a distance between the reference point and the point on the work implement in the second direction, , a distance between the reference point and the point on the work implement in the third direction, and responsively producing first, second, and third position difference signals, respectively; and receiving the current reference point position signal and the first, second, and third position difference signals and responsively determining the position of a point on the work implement in site coordinates.

\* \* \* \* \*